United States Patent
Mahlich (10) Patent No.: US 8,590,443 B2
(45) Date of Patent: Nov. 26, 2013

(54) DRINKS PREPARATION DEVICE

(75) Inventor: Gotthard Mahlich, Kronberg (DE)

(73) Assignee: Eugster/Frismag AG, Amriswil (CH)

( * ) Notice: Subject to any disclaimer, the term of this patent is extended or adjusted under 35 U.S.C. 154(b) by 599 days.

(21) Appl. No.: 12/452,253

(22) PCT Filed: Jun. 12, 2008

(86) PCT No.: PCT/EP2008/004695
§ 371 (c)(1),
(2), (4) Date: Dec. 18, 2009

(87) PCT Pub. No.: WO2008/155056
PCT Pub. Date: Dec. 24, 2008

(65) Prior Publication Data
US 2010/0126354 A1    May 27, 2010

(30) Foreign Application Priority Data
Jun. 21, 2007    (DE) ............... 20 2007 008 813 U (51) Int. Cl.
*A47J 31/44*    (2006.01)
(52) U.S. Cl.
USPC ............ 99/290; 99/291; 99/295; 99/307
(58) Field of Classification Search
USPC ........... 99/295, 291, 290, 300, 289 R, 302 R, 99/307
See application file for complete search history.

(56) References Cited

U.S. PATENT DOCUMENTS

| | | | | |
|---|---|---|---|---|
| 5,408,918 A | * | 4/1995 | King et al. | 99/289 R |
| 5,778,765 A | * | 7/1998 | Klawuhn et al. | 99/290 |
| 7,178,453 B2 | * | 2/2007 | In Albon | 99/295 |
| 2003/0200871 A1 | * | 10/2003 | Mangiapane | 99/291 |
| 2005/0034604 A1 | * | 2/2005 | Halliday et al. | 99/279 |
| 2005/0150391 A1 | * | 7/2005 | Schifferle | 99/295 |
| 2005/0223904 A1 | * | 10/2005 | Laigneau et al. | 99/295 |
| 2006/0000364 A1 | * | 1/2006 | Lau et al. | 99/295 |
| 2006/0249030 A1 | * | 11/2006 | Bienvenu et al. | 99/291 |

FOREIGN PATENT DOCUMENTS

DE    20 2007 002 910    6/2007
FR    2 842 090    1/2004

* cited by examiner

Primary Examiner — Reginald L Alexander
(74) *Attorney, Agent, or Firm* — DLA Piper LLP (US)

(57) ABSTRACT

A brewing unit of a drinks preparation device is provided with a first housing device with a coffee brewing chamber (4), having an outlet (5), for housing coffee powder and for preparation of a drink therefrom, provided with a second housing device (6) with a housing chamber (7) having a through opening (22) in the base thereof for an alternative or additional milk or foamed milk regeneration, said second device being suitable for housing a milk or milk powder portion unit (14) and for preparation of the milk or milk foam.

20 Claims, 5 Drawing Sheets

DRINKS PREPARATION DEVICE

CROSS-REFERENCE TO RELATED APPLICATIONS

This application is a national stage of international application no. PCT/EP2008/004695, filed on Jun. 12, 2008, and claims the benefit of priority under 35 USC 119 of German Utility Model Application No. 20 2007 008 813.2, filed on Jun. 21, 2007, which are incorporated herein by reference.

BACKGROUND OF THE INVENTION (1) Field of the Invention

The present invention relates to a drinks preparation device comprising a brewing chamber having an outlet which is suited for housing loose coffee powder and for preparation of a drink by the use thereof.

(2) Description of Related Art

The prior art includes drinks preparation devices which make use of loose coffee powder or pre-portioned coffee or milk concentrate or milk powder portion units. Such portion units may be available in the form of aluminum or plastic capsules or in the form of paper pouches wherein the contents of the portion units is determined for the preparation of a normal amount of coffee, milk or milk foam for one cup of a coffee, milk or coffee-milk beverage.

Prior art commercial drinks preparation devices are designed having a brewing unit which includes only one single brewing chamber for using loose coffee powder and is equipped for the preparation of milk foam with a steam nozzle and optionally with a frothing-up aid.

Coffee preparation devices for the use of lose coffee powder are provided with brewing chambers in the shape of brewing pistons or integrated brewing chambers which are supplied with ground coffee powder from coffee grinders integrated in the preparation devices. The preparation of milk foam is effected in this connection by using hot steam and fresh milk. Milk foam preparation is effected either manually by means of the steam nozzle in a separate container filled with fresh milk, or automatically in that, in a special frothing device, milk is sucked in from an external container and is frothed by means of the steam streaming with high speed from the steam generator.

Commercial drinks preparation devices comprising one brewing unit which are designed for use of pre-portioned portion units for coffee or milk extract or milk powder, are equipped with only one housing chamber for such portion unit. In such a case, it is possible to insert into the same housing chamber alternately a pre-portioned coffee portion unit for drinks preparation or a pre-portioned milk or milk powder portion unit to use it for milk or milk foam preparation. In this case, the portion units are available in the form of aluminum or plastic capsules (EP 1 06 04 915 A1).

Suggested was also a drinks preparation device for the parallel use of pre-portioned portion units for coffee and milk powder where both a housing chamber for a coffee portion unit and a housing chamber for a milk powder portion unit have been provided.

In the case of the prior art drinks preparation devices which work with ground loose coffee powder and are equipped, for milk foam preparation, with a steam nozzle or automatic frothing devices, it is necessary for the preparation of a coffee-milk beverage to proceed in two subsequent steps in the coffee and the milk foam preparation. Since in such devices preferably the same heat exchanger is used for brewing water heating and for steam generation and for steam generation which requires higher temperatures than for brewing water preparation, this results in different heating and cooling times for the heat exchanger and hence in distinct time lags for each subsequent preparation.

In the same way, in preparation devices the brewing units of which are equipped with only one housing chamber both for housing coffee portion units for the preparation of coffee and for housing milk or milk powder portion units for the preparation of milk foam, wherein the milk foam is not generated from fresh milk by means of steam but rather from milk powder with water having the same temperature as for the coffee preparation, i.e. no time lags by heating or cooling processes of the heat exchanger are necessary, significantly retarded preparation processes will occur since in view of the use of the same brewing or housing chamber for coffee, milk or milk powder portion units, it is unavoidably necessary that each second mode of preparation has to be performed in a second operation which means that after one coffee preparation cycle, for instance, first the used-up coffee portion unit has to be removed from the brewing unit, subsequently the milk or milk powder portion unit has to be inserted into the brewing unit and, finally, after the preparation cycle, has to be disposed of.

While the suggested construction of a preparation device the brewing unit of which is equipped both with a housing chamber for coffee portion units and a housing chamber for one milk powder portion unit avoids the retardation by successive feeding and removing, it is exclusively designed for the use of two portion capsules.

The disadvantage of the preparation devices which operate with loose coffee powder is, therefore, to be seen in that for preparing milk foam the preparation device has to be equipped with a steam generation device, where for steam generation a higher temperature is required than for coffee preparation, which in the normal utilization of the same heat exchanger for the brewing water and for the steam generation leads to distinct retardations in the preparation of a coffee-milk beverage because of the heating-up or cooling-down phases of the heat exchanger.

The disadvantage of the preparation devices operating on the base of coffee portion units is to be seen in that distinct prolongations of the coffee-milk beverage preparations are experienced because of the successive feeding and removing steps and the coffee preparation is not based on freshly ground coffee powder.

BRIEF SUMMARY OF THE INVENTION

It is an object of the invention to suggest a drinks preparation device by means of which the drinks preparation, particularly the coffee and/or milk or milk foam preparation can be performed flexibly in a more rational preparation process while no retardations by heating-up or cooling-down phases of the heat exchangers or by feeding and discarding processes occur, the coffee is prepared with loose, preferably freshly ground, coffee powder and for the milk foam generation, no fresh milk is required.

To solve this problem, a drinks preparation device having the following features is suggested.

By means of preparation devices of this kind, the coffee preparation, on one hand, and the milk or milk foam generation, on the other, may proceed separately or timely staggered depending on a control signal or a program, while no retardations in the preparation will occur by feeding or removing processes and the coffee is prepared with fresh coffee powder and the milk foam is generated without using fresh milk by means of pre-portioned milk powder units.

The preparation device according to the invention can have many uses for the rational preparation of drinks. For the preparation of coffee, or espresso, respectively, for instance, the coffee brewing chamber disposed in the brewing unit is supplied with ground coffee powder, either manually or, as is common in espresso full automats, by means of an integrated coffee grinder. For the milk or milk foam generation, there is additionally provided, according to the invention, in the brewing unit a second housing device into which a one-portion milk or milk powder portion unit, in the following referred to as milk powder portion unit, can be introduced where the contents of the milk powder portion unit is devised for the preparation of a normal amount of milk or milk foam for one cup of a milk or coffee milk drink. This milk powder portion unit may be a milk powder portion unit having an integrated frothing device or, a milk powder portion unit without an integrated frothing device. For the use of a milk powder portion unit without an integrated frothing device, the housing chamber should be equipped with an external frothing device. In this connection, the preparation devices may be converted to the respective use of the different milk powder portion units. The preparation of coffee or milk or milk foam is performed for all kinds of preparation with brewing water of the same temperature.

The different kinds of drinks may be generated independently from each other. It is, however, also possible, particularly for the preparation of cappuccino, to fill the brewing chamber with loose coffee powder and concurrently put one portion unit into the housing chamber provided therefore. By means of a control arrangement, the preparations of the brewed coffee and milk or a milk foam may be made at the same time or timely staggered in the desired sequence; a control of the amounts of the various ingredients conforming to the individual taste can be made as well. The control can be carried out manually or via a program control, depending on the type of device. The milk power portion units can be provided with a mechanical, optical, electrical or magnetic code which can be recorded by means of a respective reading device on the brewing unit or on the housing device for the portion unit so that the kind of preparation and the amount of the beverage can be identified by means of the control device which is connected with the outputs of the reading devices in a signal-transferring manner, which means that by means of the reading device and of the control arrangement, the preparation of the beverage can, depending on the kind of beverage, automatically be made to which purpose particularly the sequence and the amount of the water supply either to the coffee brewing chamber or to the housing chamber for the milk powder portion unit may be controlled respectively. The coffee is discharged from the brewing chamber, through its outlet during the course of its preparation. The milk or of the milk foam is discharged from the milk powder portion unit having an integrated frothing device directly from the bottom opening of the portion unit, or in case of milk powder portion units without an integrated frothing device, from the outlet of the subsequent frothing device the inlet opening of which is connected in fluid-conducting manner with the outlet opening of the portion unit, where the coffee and the milk or the milk foam are received by the same receiving vessel as for the coffee.

The vertically useable brewing unit may be employed, as mentioned above, to make only coffee, or to prepare only milk or milk foam to which end the coffee brewing chamber only is filled with loose coffee powder or the housing device receives the milk or milk powder portion unit assigned to it. To make sure that the control arrangement recognizes the presence of a portion unit in the housing device, a testing device may be disposed on the housing device for the milk powder portion unit which may be designed as a scanning device which in connection with the control arrangement opens a hot water supply to the housing device only if and when a milk powder portion unit has been inserted. In this way a safe function of the brewing unit in case of a one-sided or double-sided occupation of the brewing chamber and the housing device, respectively, is guaranteed.

An essential aspect of the preparation device is that the preparing device is as well suited for the preparation solely of coffee but also for the preparation of milk and milk foam, particularly for cappuccino or latte macchiato, without fresh milk. In a first embodiment, it can uncomplicatedly be used without any apparatus-based frothing device by using commercially available milk or milk powder portion units with an integrated frothing device.

For the use of milk powder portion units which do not include an integrated frothing device for the preparation of milk foam it is of particular advantage to provide the housing device for the milk or milk powder portion unit with a frothing device which is arranged below the milk powder portion unit housing device and is in fluid-conducting connection with the outlet thereof.

When using a milk powder portion unit with an integrated frothing device, a discharge funnel for the discharge of the milk beverage or of the milk foam may be provided below the frothing device. Both the frothing device and the discharge funnel may be exchangeable or be realized as exchangeable disposable in order to guarantee, without time-consuming rinsing and cleaning processes, a hygienic operation of the frothing device. For adaption of the drinks preparation device to use a milk powder portion unit with an integrated frothing device, it is also possible to design the frothing device exchangeable against a discharge funnel. Thereby, the drinks preparation device is suited both for the use of milk powder portion units with and without integrated frothing device. It is also possible to provide the preparation devices with an additional steam nozzle, which will permit to conventionally prepare milk foam by steam and fresh milk or to heat a liquid by steam.

The outlets of the coffee brewing chamber and of the milk powder portion unit disposed in the brewing unit and having an integrated or an additional frothing device are suitably arranged so that the products respectively prepared therein can be guided to a separate receiving vessel each. In both cases of an integrated or non-integrated arrangement of the brewing unit and the frothing device in one structural unit, however, it is possible instead to join their outlets together to form a common outlet channel in order to conduct through it one common beverage product or, timely one after the other, two beverage products into the receiving vessel.

For charging the housing device for the milk powder portion units, a simple drawer carrier may be provided. However, it is also possible instead to design the housing device with a housing device upper portion swinging up about a substantially horizontal axis or with a housing device lower portion swinging down about an also substantially horizontal axis. Alternatively, structural shapes of a housing device upper portion and a housing device lower portion movable about a substantially vertical axis can be realized as well.

Moreover, for the hygienic cleaning of the coffee brewing chamber and of the housing device for the milk powder portion unit and of the frothing device, a rinsing device simultaneously to be activated may be provided, wherein rinsing may take place either before or after a drinks preparation cycle.

For the flexible preparation of various drinks and for milk processing, particularly for the preparation of milk foam, a water supply pipe which is particularly a hot water supply pipe open by interposing a valve arrangement, into the coffee brewing chamber and into the housing device for the milk powder portion unit, wherein the valve arrangement can be activated by such a control arrangement that water is, substantially simultaneously, supplied to the coffee brewing unit and to the housing device for the milk powder portion unit or is supplied to these two devices timely staggered, or is supplied only to the coffee brewing chamber or only to the housing device for the milk powder portion unit. By the control arrangement, therefore, the water supply, the preparation sequence and the respective amounts to be dosed are controlled. Thereby the following possibilities will result, particularly for a coffee-milk beverage: Simultaneous preparation of coffee and milk or milk foam, or first brewing of coffee and subsequently brewing of milk foam, or first preparation of milk foam and subsequently brewing of coffee, or first milk, subsequently milk foam and finally espresso. The amount of water and the resulting amount of the beverage product can additionally be selected. The water supply into the coffee brewing chamber and/or into the housing device for the milk powder portion unit is carried out in this case by means of controlled valves which are preferably controlled by outputs of the control arrangement. One arrangement of the controlled valves can preferably be realized as a ceramics disc valve which is particularly suited for the preparation of high-quality drinks. The controlled valves may, however, also be realized as individual solenoid valves or as hose clip valves. A preparation water amount control and the timely sequence of the preparation procedures may be carried out by means of the valves referred to and, in a controlled way, either by means of flow meters and the control device disposed in the supply pipes, or manually to conform to the subjective taste.

Moreover, in order to increase the operating reliability, it is advisable to provide test elements for a water supply stop in case of an opened housing device for the milk powder portion unit or a drawn-out drawer carrier in connection with the control arrangement and the controlled valves, or to interrupt by means of mechanical blocking devices or electric device the preparation water supply, for instance by an interruption of the electric supply line of the water pump.

The preparation of a desired beverage may be carried out fixed-programmed automatically in that the sequence of the preparation of the beverage components as well as the amount thereof, particularly for the coffee and milk foam preparation are fixed-programmed. A plurality of such programs may advantageously be stored for a variety of beverages in the control arrangement and may be selected by means of a selection device. Such control may however also be carried out manually to conform to the subjective taste.

BRIEF DESCRIPTION OF THE SEVERAL VIEWS OF THE DRAWINGS

Embodiments of the invention will be described in more detail based on a drawing comprising 8 figures in which further advantageous features of the invention may be disclosed.

FIG. 5$a$ is a flow chart for the preparation of cappuccino.

FIG. 5$b$ is a flow chart for the preparation of espresso.

FIG. 5$c$ is a flow chart for the preparation of latte macchiato.

DETAILED DESCRIPTION OF THE INVENTION

Figure 1:
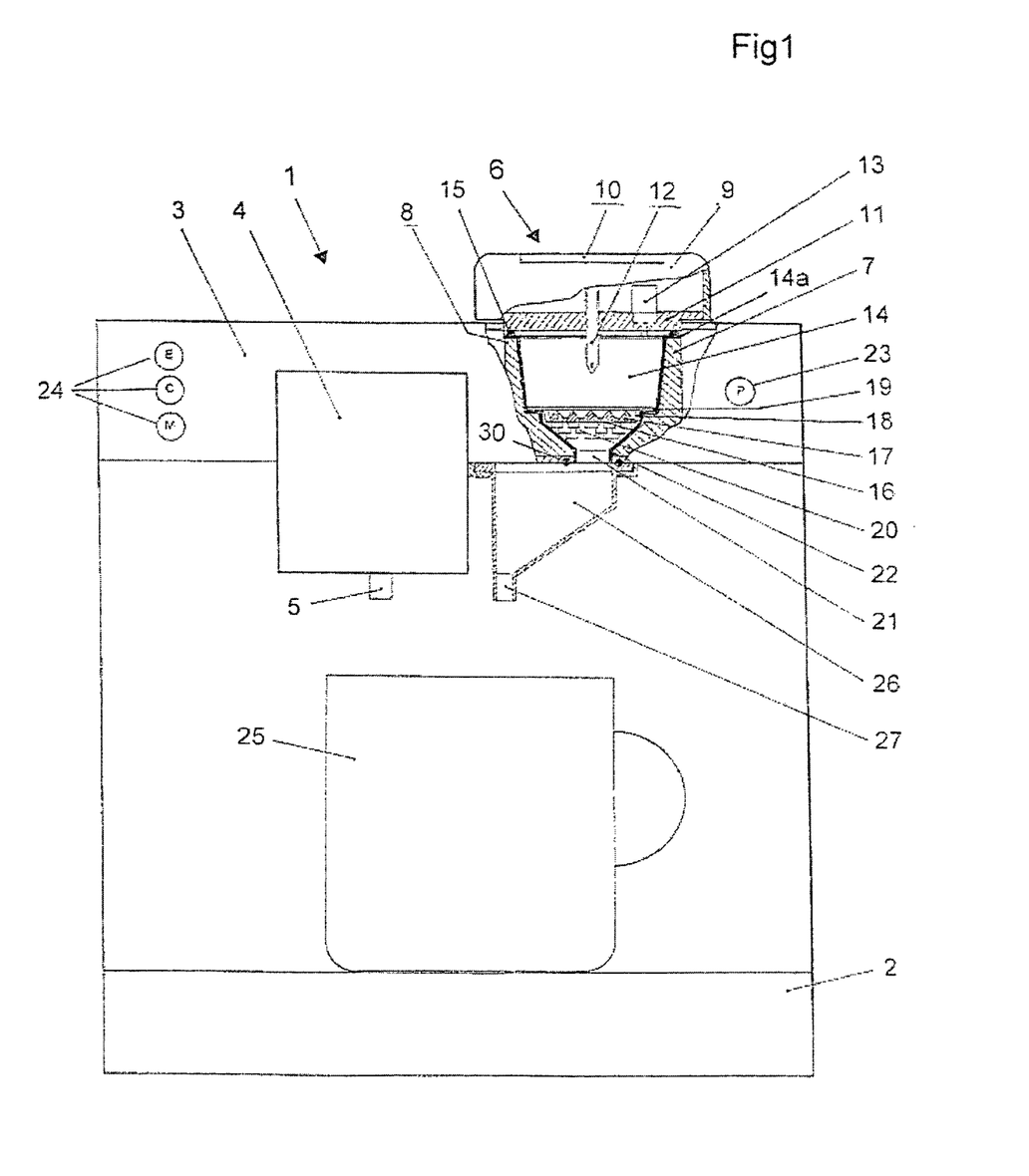
FIG. 1 is a front view partly in cross section of a diagrammatically shown drinks preparation device in a first embodiment comprising a brewing unit including a brewing chamber for loose coffee powder and a housing device for a milk powder portion unit comprising an inserted milk powder portion unit having an integrated frothing device, further having a water supply pipe docked to the water supply pipe of the brewing unit and a water supply needle pierced into the milk powder portion unit and a micro switch as the testing element for the filling control of the housing device, wherein the coffee brewing chamber is not shown in detail.
Figure 2:
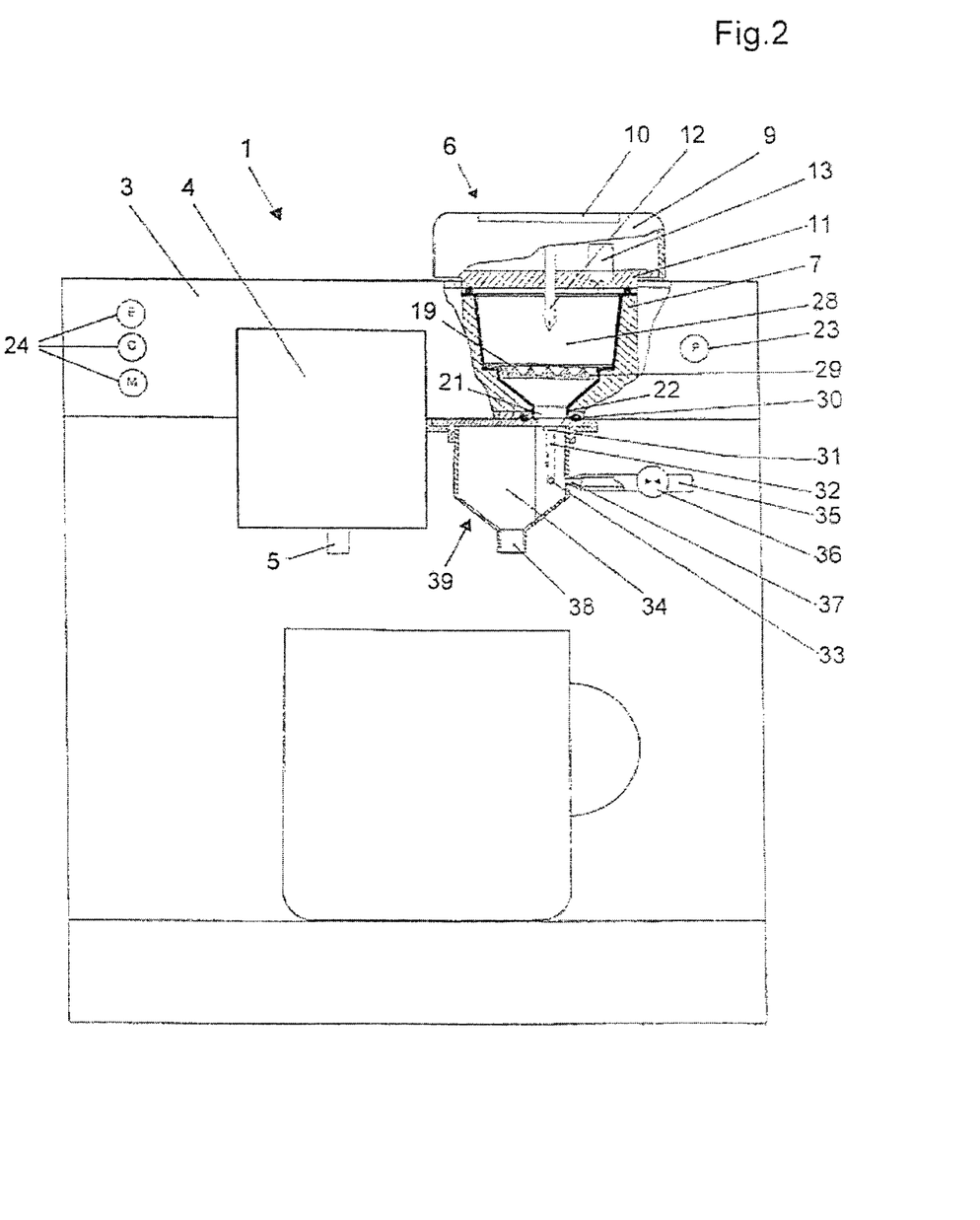
FIG. 2 is a front view partly in cross section of a diagrammatically shown drinks preparation device in a second embodiment comprising a conventional brewing chamber for loose coffee powder and a housing device for one milk powder portion unit comprising an inserted milk powder portion unit without an integrated frothing device, having a successive frothing device, having a water supply pipe docket to the water supply pipe of the brewing unit and a water supply needle pierced into the milk portion unit and a micro switch as the testing element for the filling control of the housing device, wherein the coffee brewing chamber is not shown in detail.
Figure 3:
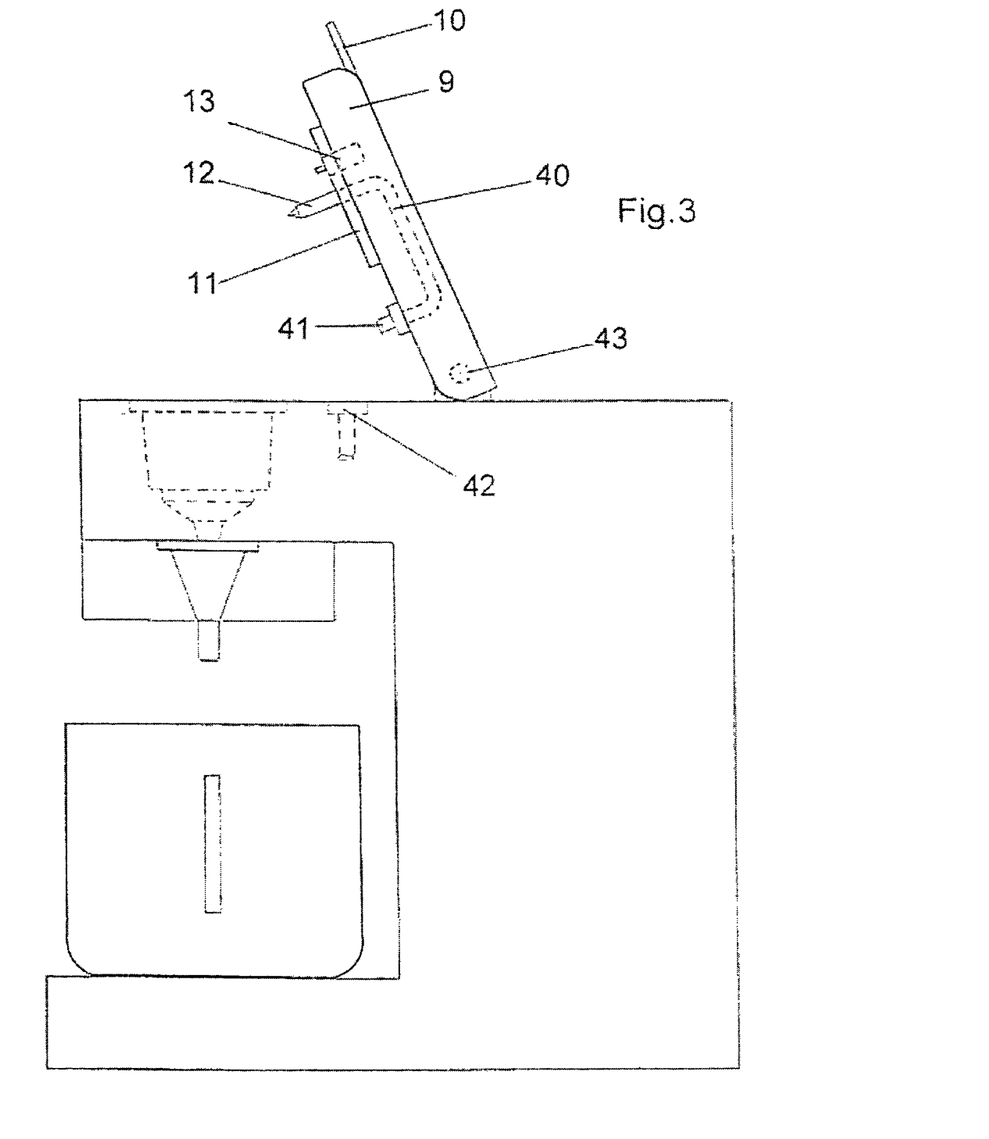
FIG. 3 is a side view of a diagrammatically shown drinks preparation device with the upper portion turned open.

The drinks preparation device 1 shown in FIGS. 1, 2 and 3 has especially been designed for the optional preparation of either espresso, cappuccino or latte macchiato, a beverage combination of a bedding of milk, of espresso disposed upon it and again milk foam disposed upon all, and to this end includes above a device base 2 and a receiving vessel 25 a brewing unit including a coffee brewing chamber 4 for ground coffee powder and a housing device 6 for one milk powder portion unit 14, 28. The coffee brewing chamber 4 has not in this case been shown in detail.

The drinks preparation device comprises a control arrangement 48 which is in connection with a group of program selection buttons 24. By means of these program selection buttons 24 it is possible either to select, and start, depending on the equipment of the device, a fixed program for a particular kind of beverage including the respective sequence and amount assignment of the beverage ingredients, or to pre-program a respective program.

In the housing chamber 7 of the housing device 6 of FIG. 1, an encapsulated milk powder portion unit 14 including an integrated frothing device 39 has been inserted. The housing chamber 7 for the milk powder portion unit is of a shape corresponding to the shape of the milk powder portion unit, wherein the milk powder portion unit having an upper cover edge 14$a$ which has a larger diameter than the portion itself, rests on the upper edge 8 of the housing chamber 7. The housing device 6 is provided with a turn-up upper part 9 which can be turned-up about a horizontal axis 43 as is shown in FIG. 3. For the turning-up process, an actuation handle 10 is provided on the upper part. In the upper part 9, there is a cover plate 11 including a seal 15 which rests, in the closed and locked state of the housing device 6, on the cover edge 14$a$ of the portion unit 14 and in this way locks the housing device, pressure and liquid-tight. The locking device is not shown. In the upper part 9, moreover, the water supply pipe 40 including the connection socket 41 for the connection to the water supply 42 of the brewing unit 3 and the water supply needle 12 for the milk powder portion unit 14, and the testing element 13 for the filling control of the housing device 6 are disposed. In the closed and locked state of the housing device, the water supply needle 12 is pierced into the milk powder portion unit 14. The foaming device integrated in the milk or milk powder portion unit 14 comprises, on the bottom of it, a pyramid plate 16 disposed inside which can pierce by means of pyramids 17 through a separation foil 19 arranged above it. The pyramid plate 16 includes, at its edge, a sieve comb 29 and, below its bottom face, a foaming labyrinth 20 for the milk foam generation. The milk powder portion unit 14 includes at its lower end which becomes narrower to form a funnel, an outlet 21 for the milk foam generated. The housing device 6 is provided with an outlet aperture through which passes the outlet 21 of the milk powder portion unit. Below the outlet aperture 22, an exchangeable discharge funnel 26 including a milk foam outlet 27 is disposed.

In FIG. 2, in the housing chamber 7 of the housing device 6, an encapsulated milk powder portion unit 28 having no integrated frothing device has been disposed. For using such a milk powder portion unit having no integrated frothing device, the preparation device 1 is additionally provided with an external frothing device 39. The frothing device 39 is arranged below the outlet aperture 22 of the housing device 6 and its inlet opening 31 is in fluid-conducting and fluid-tight connection with the outlet opening 21 of the milk powder portion unit 28. The frothing device 39 may, when using milk powder portion units having no integrated frothing device below the outlet aperture 22 be simply positioned by an inserting, tilting, clipping or screwing process or may be exchanged against the discharge funnel 26.

Figure 6:
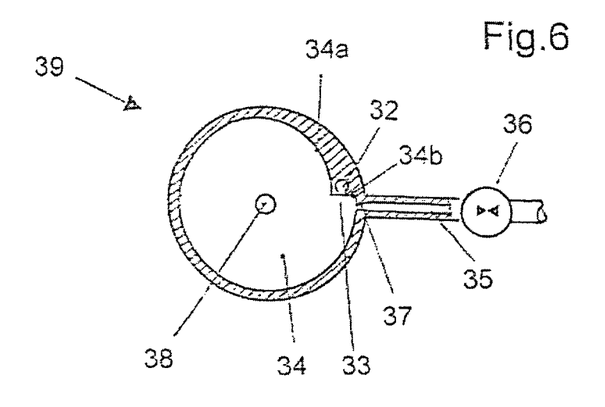
FIG. 6 is a cross section through the frothing cylinder of the frothing device.

In the extension 32 of the inlet opening 31, the milk frothing device 39 having an inner frothing cylinder 34 includes, as shown in FIG. 6, in a thickened section of a spirally shaped frothing cylinder wall 34a, a milk inlet nozzle 33 having a horizontal nozzle outlet and a vertical bore which is in connection with the milk outlet 21 of the milk and milk powder portion unit 28. The nozzle outlet of the milk inlet nozzle 33 is arranged in the axial elongation of an air nozzle 37, as can be taken in detail from FIG. 6, wherein the frothing device 39 is shown in cross section at the level of the nozzle outlet of the milk inlet nozzle 33 and of an air nozzle 37. The air nozzle 37 is fed with atmospheric air via an air pipe 35 which can be locked by means of a locking valve 36. The milk foam generated in the frothing cylinder 34 may be discharged, through an opening 38 in the bottom of the frothing cylinder 34 which in this way forms a milk foam outlet, into the receiving vessel 25.

Figure 4:
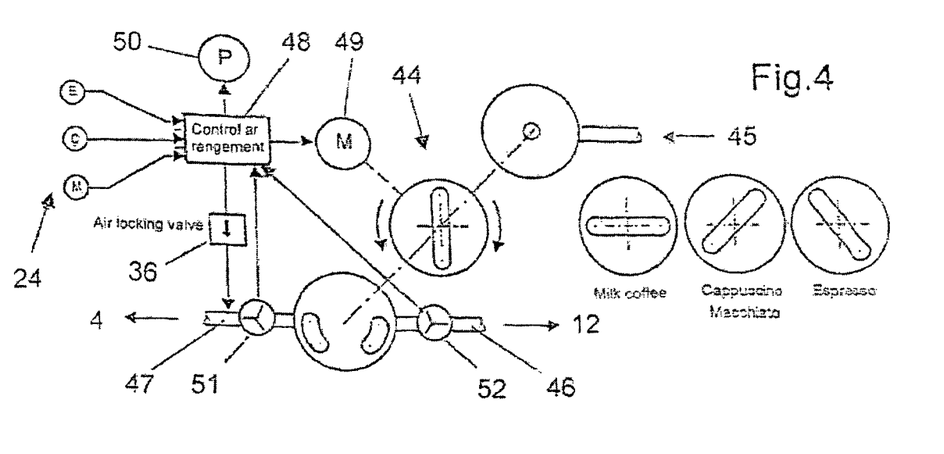
FIG. 4 is a block diagram of the ceramics valve control.

In FIG. 4, the two-way ceramics valve 44 which is connected to the hot water supply 45 is shown displaying three ceramic discs taken apart. Of the three discs, an outer disc has an outlet 47a with which the brewing water supply pipe 47 to the coffee brewing chamber 4 is connected, and a further outlet 46a which is connected via the hot water supply pipe 46 with the hot water supply needle 12 in the housing device 6. Depending on the position of the middle disc of the ceramics valve 44, the outlet 47a or the outlet 46a may be used for the preparation of coffee or milk foam. In the position of the middle disc of the ceramics valve 44 shown on the left part of FIG. 4, it is in the zero position. For the preparation of a beverage, the disc may, depending on the desired kind of beverage, be rotated either by hand or pre-programmed by means of the control arrangement 48 and a motor 49 successively into the position "Espresso" or "Milk/Milk foam", Latte Macchiato" or "Milk coffee". These possible rotation positions are depicted for the free middle disc in the right part of FIG. 4. After the preparation cycle, the middle disc is rotated either by hand, or suitably coupled together with the opening process of the brewing chamber 4 or of the housing device 6, into the zero position.

Figure 5A:
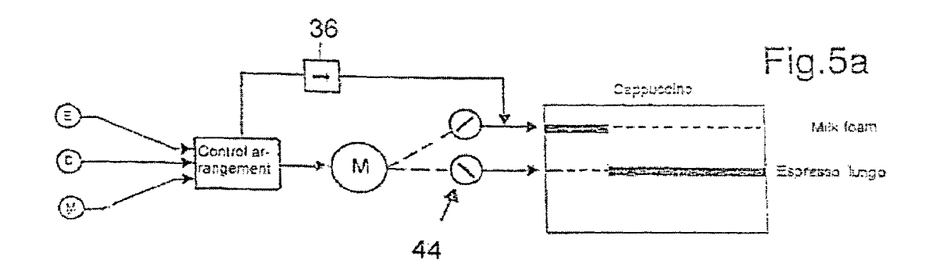
Figure 5B:
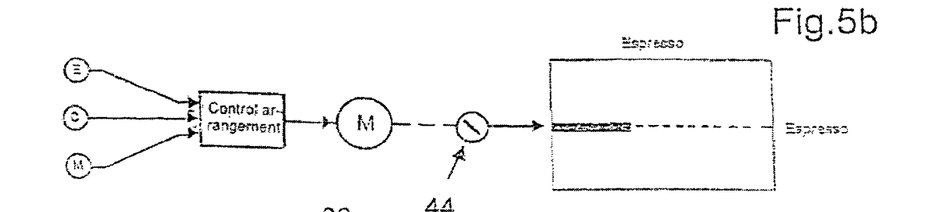
Figure 5C:
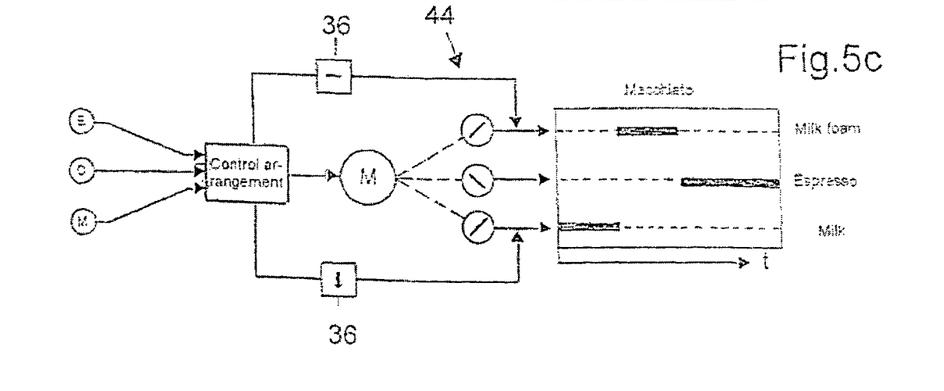

The FIGS. 5a through 5c show the position of the ceramics valve 44 and of the air locking valve 35 controlled by the control arrangement 48 and the timely flow charts for the various drinks preparations. The drinks preparation device shown in FIGS. 1 through 6 is particularly designed for the optional preparation of espresso, cappuccino or latte macchiato.

By means of the group of selection buttons 24 and depending on which button has been activated, it is possible to prepare espresso by button E, cappuccino by button C and latte macchiato by button M. By means of the group of selection buttons 24 or a program selection switch, depending on the equipment of the device, a fixed program for a predetermined kind of beverage including the respective sequence and amount assignment of the beverage ingredients may be selected and started, or a program may first be pre-programmed and then started, where a control arrangement 48 which can directly be commanded by means of the program selection buttons 24, or pre-programmed, controls a valve arrangement which opens the water supply paths for the coffee brewing chamber 4 or the housing device 6. By means of the control arrangement 48, in addition, the air locking valve 36 provided in the air pipe 35 is controlled as well.

Instead of the foregoing, a very simple solution may be realized by means of a manually actuated selection lever which is connected with a mechanical two-way valve of zero position, which is preferably a two-way ceramic disc valve, or by means of hose clip valves for an alternative or cumulative water supply to the coffee brewing chamber 4 and to the housing device 6 for the milk powder portion unit 14, 28, in which case also the control of the amount of the water for the preparation may manually be made to conform to the subjective taste.

After switch-on of the coffee preparation device by means of a mains switch 23 and selection of the beverage to be prepared by actuating one of the program selection buttons of the group 24, water will be pumped from a water storage container through a continuous-flow water heater, and the hot water is supplied, via the controlled valve arrangement which can be realized as ceramic disc valve 44 or through solenoid or hose clip valves, depending on the program, either to the coffee brewing chamber 4 or the housing chamber 6 or to the two devices simultaneously or successively.

In the case of a selected coffee preparation, the coffee brewing chamber 4 is loaded with loose coffee powder and is started by switching the preparation device 1 on by means of a mains switch 23. Subsequently, the preparation water is pumped from a water container by means of a pump 50 through a continuous-flow water heater and is pumped via the valve arrangement opened by means of the control arrangement and a flow meter 51 into the coffee brewing chamber 4. When using a boiler, the water is heated in it and is piped under vapor pressure via the valve arrangement 44 and a flow meter into the coffee brewing chamber. The coffee liquid generated thereby flows from the coffee outlet 5 of the coffee brewing chamber into the receiving container 25.

For the preparation of a coffee-milk beverage, the coffee brewing chamber 4 of the brewing unit 3 of the preparation device 1 is loaded with loose coffee powder, as for a coffee preparation, and is inserted into the housing device 6 for the one milk powder portion unit 14, 28. To this end, the upper part 9 of the housing device 6 is tilted upwardly and, in a first form of use, the milk powder portion unit 14 including an integrated foaming device is inserted into the respective housing device 7. Subsequently, the housing device 6 is closed, pressure and liquid tight, by tilting down its upper portion and locked, compare FIG. 1. At this instance, it is checked by means of a testing device which is realized for instance by a micro switch 13 or the control arrangement 48, whether a milk powder portion unit is located in the housing device 6 or whether the housing device upper part 9 has been lowered upon it and is locked. During the course of the lowering process, the water supply pipe 40 is docked to the water supply 42 of the brewing unit, and at least one water supply needle 12 within the housing device is pierced into the milk powder portion unit 14, whereupon the drinks preparation device is closed and prepared for the drinks preparation.

When for a milk or milk foam preparation, by means of a respective selection order to the control arrangement, hot water is supplied to the milk powder portion unit 14 having an integrated frothing device via the ceramic disc valve 44, or a different valve arrangement, and the flow meter 52 to the hot water supply needle 12, the milk powder will dissolve under heating up, and when reaching a device system-depending preparation water pressure, the pyramids 17 of the pyramid plate 16 will pierce through the separation foil 19 lying on it whereupon the heated milk flows through the sieve comb shaped on one outer periphery of the pyramid plate 16 into the frothing labyrinth 20 formed out on the lower side of the pyramid plate. In the frothing labyrinth 20, the heated milk is frothed. The milk foam generated flows via the milk foam outlet 21 of the milk powder portion unit into a receiving vessel 25.

In the following, the milk or milk foam preparation is described in a second embodiment by using a milk powder portion unit 29 without an integrated frothing device.

Loading of the housing chamber 7 with the milk powder portion unit and the milk preparation procedure in the portion unit 28 are identical to that of the first embodiment.

The milk powder dissolved in the milk powder portion unit 28 mixes, within it, with the hot water and the mixture flows, after the pyramids 27 of the pyramid plate 16 have pierced, at a water pressure determined by the device system, the separation foil 19 provided between the milk powder or the resulting milk, respectively, and the pyramid plate 16, through the sieve comb 29 formed out on the periphery of the pyramid plate 16 and subsequently out of the milk outlet 21 of the milk powder portion unit 28 and the outlet aperture 22 of the lower part of the brewing unit into the inlet opening 31 of the foaming device 39 arranged below the outlet aperture 22 and in fluid-conducting connection with the outlet of the milk powder portion unit 28. In the frothing device 39, the flow of the milk still under the feed pressure of the pump 50 through the milk inlet nozzle 33 is trans-ported tangentially into the frothing cylinder 34, where by the substantially spiral-shaped configuration of the cylinder wall 34a and by positioning the milk inlet nozzle 33 on a step 34b formed in the cylinder wall, a whirl and, in the zone of the milk inlet, an under pressure will occur. Due to this under pressure, air is sucked in from the air nozzle 37 which opens staggered, at the side of the milk inlet nozzle 33 into the frothing cylinder, from the air pipe 35 which is open to the atmosphere. Based on these processes, milk foam of the desired consistence is generated in the frothing cylinder 34, which exits through the bottom opening 38 of the frothing cylinder 39, which constitutes the milk foam outlet.

During the course of the milk foam generation, the locking valve 36 disposed in the air pipe 35 is open. If, on the other side, the locking valve 36 is closed, which can be made manually or program-controlled automatically, and hence the air supply to the frothing cylinder 35 is blocked, foam generation in it is substantially avoided, and from the bottom opening 38 of the frothing cylinder 39 heated milk will come out.

By program control it is therefore possible to generate in a sequence milk—milk foam—espresso—latte macchiato.

Particularly when using a milk powder portion unit 28 without an integrated frothing device, it is possible to prepare, in addition to a coffee-milk beverage, only hot milk or, when using loose cocoa powder, milk cocoa.

After the preparation of the beverage, the milk powder portion unit 14, 28, may either manually or automatically be removed, depending on the type of preparation device.

LIST OF REFERENCE NUMERALS

1 Drinks preparation device
1 Device base
2 Brewing unit
3 Coffee brewing chamber
4 Coffee outlet
5 Housing device
6 Housing chamber
7 Upper housing chamber edge
8 Upper part
9 Actuation handle
10 Cover plate
11 Water supply needle
12 Testing element
13 Milk powder portion unit including integrated frothing device
14a Milk powder portion unit, upper edge
15 Seal
16 Pyramid plate
17 Pyramid plate
18 Sieve comb
19 Separation foil
20 Frothing labyrinth
21 Milk powder portion unit outlet
22 Outlet aperture
23 Mains switch
24 Program buttons group
25 Receiving vessel
26 Discharge funnel
27 Milk foam outlet
28 Milk powder portion unit without integrated frothing device
29 Sieve comb
30 Seal
31 Frothing device inlet opening
32 Extension channel
33 Milk inlet nozzle
34 Frothing cylinder
34a Spiral wall of the frothing cylinder
34b Foaming cylinder wall step
35 Air pipe
36 Air locking valve
37 Air nozzle
38 Milk foam outlet
39 Frothing device
40 Water supply pipe
41 Connection socket
42 Water supply pipe of the brewing unit
43 Horizontal axis
44 Ceramics valve
45 Hot water supply
46 Water supply pipe to the water supply needle
47 Water supply pipe to the coffee brewing chamber
48 Control arrangement
49 Motor
50 Water pump 51 Flow meter
52 Flow meter

The invention claimed is:

1. A brewing unit of a drinks preparation device comprising:
 a first housing device, which is a coffee brewing chamber having an outlet, which is suitable to house loose ground coffee powder and to prepare a beverage therefrom,
 a second housing device including a housing chamber having an outlet aperture in its bottom which is suited to house a milk or milk powder portion unit and to prepare a milk produce, particularly milk foam by means of a water supply needle, wherein
 the second housing device includes an upper part that can be turned up about a substantially horizontal axis in the upper part of the second housing device, and
 in the upper part of the second housing device, a water supply pipe including a connection socket for connection to a hot water supply pipe of the brewing unit, and the water supply needle for the milk or milk powder portion unit are provided.

2. The brewing unit according to claim 1, wherein the interior shape of the housing chamber is adapted to the respective outer shape of the milk or milk powder portion unit to be housed.

3. The brewing unit according to claim 1, wherein the housing chamber is suited to house a milk or milk powder portion unit having an integrated frothing device.

4. The brewing unit according to claim 1, wherein below said housing chamber a discharge funnel is arranged.

5. The brewing unit according to claim 4 wherein said discharge funnel is exchangeable.

6. The brewing unit according to claim 1, wherein said housing chamber is suited to house a milk or milk powder portion unit without an integrated frothing device.

7. The brewing unit according to one of claims 1, 2, and 6, wherein below said housing chamber a frothing device is arranged which is in fluid-conducting connection with the outlet of said housing chamber.

8. The brewing unit according to claim 7, wherein said frothing device is exchangeable.

9. The brewing unit according to claim 7, wherein said frothing device is made as a disposable part.

10. The brewing unit according to claim 1, wherein in the upper part of the second housing device, a testing element for filling control of said housing chamber is arranged.

11. The brewing unit according to claim 1, wherein said upper part of said housing device is provided with sealing elements and locking elements for pressure and fluid-tight closure of the housing device.

12. The brewing unit according to claim 1, wherein
 one water supply pipe each opens to the coffee brewing chamber and to the second housing device for the milk powder portion unit, and
 the water supply can be activated by means of a control arrangement which is so designed that water is supplied essentially simultaneously either to the coffee brewing chamber and to the second housing device or only to the coffee brewing chamber or only to the second housing device.

13. The brewing unit according to claim 12 wherein said control arrangement comprises controlled valves via which the water supply to said first housing chamber and to said second housing chamber is effected.

14. The brewing unit according to claim 13, wherein the controlled valves are ceramic disc valves.

15. The brewing unit according to claim 13 wherein the controlled valves are solenoid valves.

16. The brewing unit according to claim 13, wherein the controlled valves are hose clip valves.

17. The brewing unit according to one of claims 1 and 12, wherein
 on said second housing chamber a testing unit is disposed which is connected with the control arrangement, and
 said testing unit and said control arrangement are so designed that a water supply to said second housing device is opened only if and when a portion unit is inserted in said housing chamber.

18. The brewing unit according to claim 12, wherein said control arrangement is suited to control a fixed-programmed sequence and amount of the water supply into the first housing chamber holding a coffee powder filling and into the second housing device holding a milk or milk powder portion unit whereby cappuccino is automatically prepared.

19. The brewing unit according to claim 12, wherein
 in said control arrangement, a plurality of programmes for sequence and amount of the water supply to the two housing devices holding a coffee powder filling and holding a milk powder portion are stored, and
 in said control arrangement a selection device is provided by which one of the stored programs can be selected.

20. The brewing unit according to claim 1, wherein control elements are provided which stop the supply of preparation water as soon as either the first or the second housing device is opened.

* * * * *